April 18, 1961     S. S. GUTERMAN     2,980,803
INTELLIGENCE CONTROL SYSTEMS
Filed March 11, 1955     2 Sheets-Sheet 1

INVENTOR
SADIA S. GUTERMAN
BY *Elmer J. Gorn*
ATTORNEY

April 18, 1961 S. S. GUTERMAN 2,980,803
INTELLIGENCE CONTROL SYSTEMS
Filed March 11, 1955 2 Sheets-Sheet 2

INVENTOR
SADIA S. GUTERMAN
BY *Elmer J. Gorn*
ATTORNEY

United States Patent Office 2,980,803
Patented Apr. 18, 1961

2,980,803

INTELLIGENCE CONTROL SYSTEMS

Sadia S. Guterman, Dorchester, Mass., assignor to Raytheon Company, a corporation of Delaware Filed Mar. 11, 1955, Ser. No. 493,741

7 Claims. (Cl. 307—88)

This invention relates to intelligence control systems, and, more particularly, to the storage and transmission of electrical energy representative of numerical digits to be counted or informational or logical components to be utilized in a computing operation or in a machine or apparatus for controlling functional sequences.

The invention is characterized by the application, to one or more two-positional elements, of position-controlling circuitry functioning to produce predetermined reactions and operational patterns in said element or elements by utilization of position reversal-inhibiting properties inherent in said circuitry.

The invention is applicable to multi-stage computing or data-handling devices, among other things, which devices may include, in each stage, one or more cores of ferromagnetic material having high magnetic retentivity and a relatively open hysteresis loop characteristic, approaching the rectangular in shape, so that when the core is magnetized to a condition of flux saturation of one polarity, it tends to remain in such state until the direction of flux saturation is reversed, as by application of a flux-reversing force in the form of a pulse of current delivered to a winding carried by the toroidal core. To such a known arrangement, the present invention adds the inventive concept of simultaneously delivering two current pulses to two distinct and oppositely acting windings on such a core whenever it is desired to neutralize the effect of single pulse delivery; in other words, the production, simultaneously, of oppositely acting magnetizing forces, one of which "inhibits" the fulfillment by the other of its normal function of reversing the direction of flux saturation. Thus either of two results of opposing significance can be registered, depending upon whether one or both such core windings receive current pulses in any given operational period.

This and other characteristics of the invention will be apparent as the description thereof progresses, reference being had to the accompanying drawings wherein.

Figure 3:
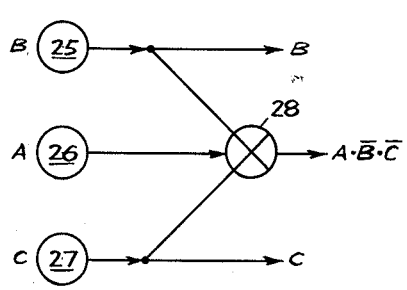
Figure 4:
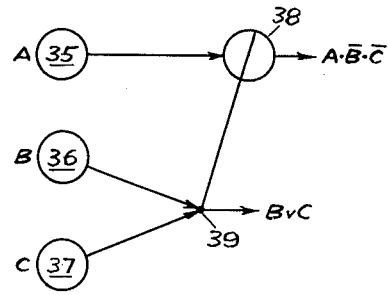
Figure 5:
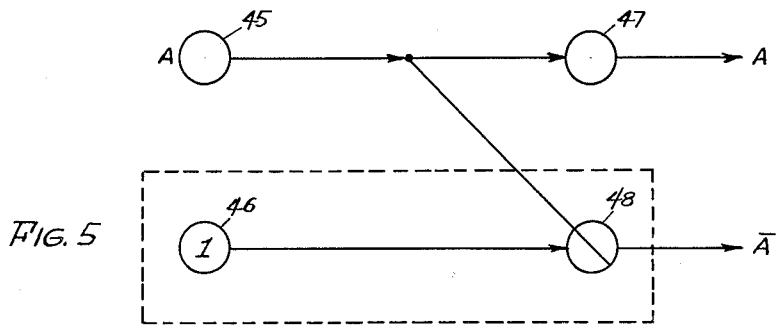
Figure 6:
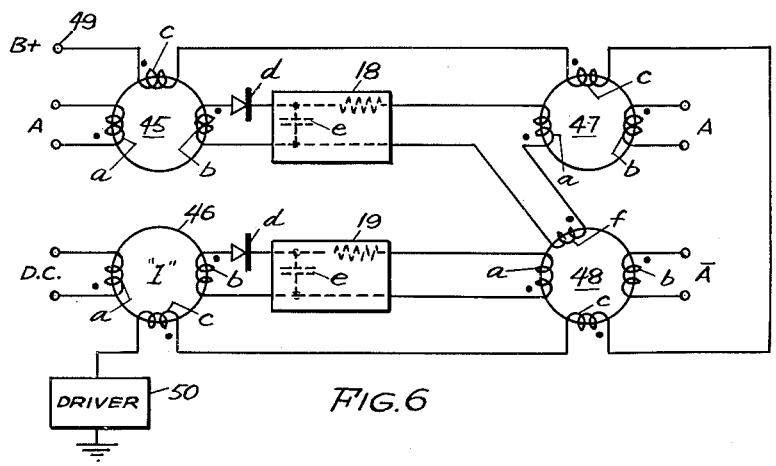
Figure 3A:
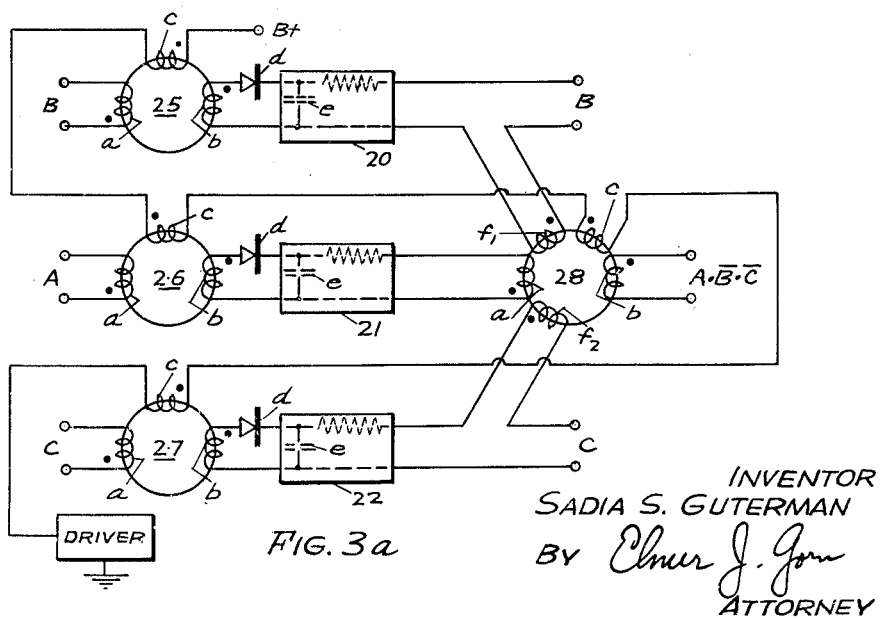

Figs. 3, 4, and 5 show other logical schemes which can be executed by utilizing the magnetic reversal-inhibiting technique disclosed herein; and Figs. 3a and 6 are diagrams of cores and circuitry embodying the logical schemes suggested in Figs. 3 and 5, respectively.

Figure 1:
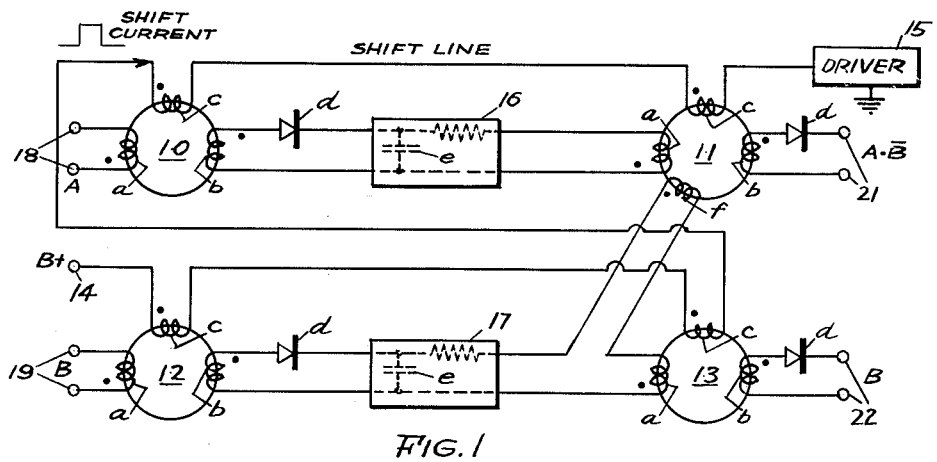
Fig. 1 is a diagram of magnetic cores and inter-linking circuitry embodying the invention.

Referring first to Fig. 1, the four ferromagnetic cores 10, 11, 12 and 13 are arranged in inter-linked pairs, with each pair being adapted to function as a pair of successive stages of a digital computer, or other data storage and transfer system, in which each core is capable of holding itself in a condition of magnetic flux saturation of such a polarity as to represent an arbitrarily assigned binary digital value. Three windings, an input winding "a," and output winding "b," and a shift winding "c," are carried by each core, and the shift windings of all the cores are arranged in series to form what has come to be known as a "shift line," to which core flux-reversing "shift" pulses are applied from a source 14 under the control of triggering pulses applied to driver unit 15. Saturation of a core in the direction of the field applied by the shift pulse has been arbitrarily agreed upon, as a conventional practice in the art, as representative of the "0" binary digit value, whereas saturation in the opposite direction is assumed to represent a "1" digital value.

Application of a shift pulse clears all the cores to the "0" state, thus inducing a current-generating voltage in the output winding of each core that has previously been in the "1" state. If current is thus generated in core windings 10b and 12b, for example, it will be stored temporarily in delay networks 16 and 17, each including a storage condenser "e" to which the current passes by way of its associated unidirectional impedance diode "d," the delay interval established by network 16 or 17 being designed to be sufficient to overlap the period required for completion of the saturation polarity-reversing process.

The ensuing discharge of each condenser "e" causes a signal input to core 11, or core 13, as the case may be, which signal input will represent the conversion of such core (11 or 13) from the "0" signal state to the "1" signal state, in effect, a transfer to the new core stage of the "1" signal value theretofore standing in the preceding core stage. The above-described apparatus for accomplishing such signal transfer is commonly called a "shift register."

In computing operations it is frequently desirable to make a choice between (a) permitting automatic delivery of a digital value from one stage to the next, and (b) nullifying or "inhibiting" such delivery, so that for the particular digital shift period involved, the first of two cores will lose its pre-existing "1" representation, but such representation will not follow the normal course of being entered into the second of the two cores. That is to say, it may be desirable, on selected occasions, to permit each of two successive cores to assume the "0" state, even though the first (at least) of the two had previously been in the "1" state.

To provide for such selective inhibiting of the automatic digital transferring function normally performed by core 10 (Fig. 1), there is added to core 11 a fourth winding "f" whose polarity is opposite to that of input winding 11a (as indicated) by the "dot" positioning adjacent thereto). This winding "f" will hereafter be referred to as the "inhibit" winding. When this winding 11f receives energy from output winding 12b of core 12 (by way of delay network 17), signifying that a "B"-representing signal has just been transferred out of core 12, the said energy input to winding 11f tends to cancel the effect of the "A" signal energy concurrently entering core 11 by way of input winding 11a. The result is that core 11 will remain in the "0"-representing state to which it had previously been shifted (by the effect of the shift pulse applied thereto in the preceding shift period). Thus there is, in effect, a selective suppression of the "1" signal that would normally have been transferred from core 10 to core 11 during the particular interval of shift register operation under consideration, the normal transfer operation having been nullified, or inhibited, by the intervention of energy previously entered in core 12 by application of a pulse of "B" code significance to input circuit 12a. Hence, if signals entered in core 12 are arbitrarily assigned a "B" code significance, while those entered in core 10 have an "A" code significance, the normal output at terminals 21 will have an "A, and not a B" ($A \cdot \bar{B}$) significance. When normal output at terminal 21 is interrupted by entry of "B" signal energy in core 12, and the subsequent shifting of such signal energy to core 11 (via inhibit winding 11f), the result will be an absence of "A" output at terminals 21 for such operational interval, and the concurrent presence of a "B" output at terminals 22, supplied by output winding 13b of core 13, whose input winding 13a (being in series with winding 11f) is energized by the same "B" representing signal energy that operates the inhibit winding 11f.

Since windings 11a and 11f are both driven from corresponding stage-points in the parallel "A" and "B" lines, as illustrated in Fig. 1, the two oppositely-acting magnetizing forces established thereby will tend to be identical, within a narrow tolerance range. Because of this near-identity it is desirable to design the inhibit winding 11f to be somewhat more powerful than winding 11a, thus providing assurance that the desired inhibition of signal entry will occur.

Figure 2:
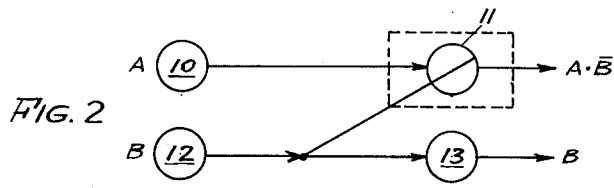
Fig. 2 shows the logical scheme incorporated into the circuitry of Fig. 1.

The operations that can be performed by the arrangement of parts illustrated in Fig. 1 are presented schematically in Fig. 2, where the several cores 10 to 13 are represented by circles, the inter-core circuitry by straight lines, and the inhibiting function by the extension of the pertinent line through the pertinent core (11) in diametrical fashion. Other applications of the inhibiting principle herein disclosed are presented schematically in Figs. 3, 4 and 5. These will be referred to in the order of their numbering.

The arrangement indicated in Fig. 3 will function to permit inhibition in a single core 28 by signal inputs ("B," "C") from either of two controlling cores 25, 27, while otherwise permitting delivery of a third signal ("A") originating at the core 26. As indicated in Fig. 3a, signal "A" will be inhibited when either winding $28f_1$ or $28f_2$ carries current, representative of a signal input at either core 25 or core 27. The arrangements and operation of the other parts shown in Fig. 3a are the same as that of the corresponding parts in Fig. 1.

The arrangement indicated in Fig. 4 will also function to permit inhibition, in a single core 38, by the output signal ("B" or "C") of either of two cores 36 and 37 whose output circuits are mixed or buffered to point 39 before delivering their resultant mixed signal energy to the inhibiting winding of said core 38. The latter will deliver an output signal ("A"), when such a signal is received from core 35, in an operating interval that finds core 38 uninhibited by any competing signal from junction point 39.

The arrangement indicated schematically in Fig. 5 (and with actual wiring in Fig. 6) will function to produce an output signal (from core 48) that is the binary complement of the signal entered in core 45. This Fig. 5–Fig. 6 arrangement makes use of a "one" generating core 46, that is, a core which delivers signal energy of "1" binary significance on each application of a shift pulse by way of shift winding 46c, energized from source 49 each time driver 50 is triggered. This delivery of "1" signals in a constant, unchanging pattern is made possible by employing continuous (direct) current of the desired polarity as the source of energy supply to input winding 46a, rather than pulse current of changing polarity, and lacking in continuity. The continuous current is chosen to be large enough to switch the core 46 fully in the minimum period between shift pulses. Although this current actually opposes the shift pulse (whose polarity is opposite to that of the continuous current, as indicated by the opposite positioning of the polarity "dots"), it is chosen to be small enough relatively, to maintain such opposition at a negligible magnitude; if not negligible, in any given installation, its opposing effect can be offset by increasing the number of turns in winding 46c.

As indicated in Figs. 5 and 6, the output of the "one" generating core 46 is delivered to core 48, so that the latter's output will always be the complement of the "A" signal delivered thereto from core 45, by way of inhibiting winding 48f, constituting part of the output circuit of core 45, and being in series with input winding 47a of core 47. Hence if a signal of "A" significance is entered in core 45, the cores 47 and 48 will deliver "A" and "Ā" signals, respectively, the vinculum over the code letter signifying negation of the value represented by the code letter alone.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In an intelligence control system, transferror and transferee field-sustaining cores having input, output and series-connected field-shifting windings thereon, a single inhibiting winding on said transferee core, a delay network including capacitive storage means connecting the output winding of said transferror core with the input winding of said transferee core, said input winding of said transferee core adapted to cause current flow in one direction in the output winding of said transferee core, and means including said inhibiting windings for establishing magnetic flux saturation in the associated core in a direction opposite to that established by said input windings to set up an opposing magnetic flux in a degree sufficient to prevent by flux cancellation any substantial change in the field-condition of said core, notwithstanding operation of said first-named current flow-causing means.

2. In a control system, transferror and transferee field-sustaining elements, means including a winding on said transferee field-sustaining element responsive to a first information signal for producing field reversal in said transferee field sustaining element, and inhibit winding means on said transferee field-sustaining element responsive to a second information signal for preventing by magnetic flux cancellation such field reversal in said transferee element notwithstanding operation of said first recited means, thereby to cancel said first information signal, a third field-sustaining element having an input winding in series with said inhibit winding, said third field-sustaining element adapted to deliver said second information signal at a time when said transferee core field-sustaining element is inhibited from delivering said first information signal.

3. In a control system, transferror and transferee field-sustaining elements having input and output windings associated therewith, delay network means connecting the output winding of said transferror element with the input winding of said transferee element, winding means on said transferror and transferee field-sustaining elements for simultaneously producing field reversal in said transferror and transferee field-sustaining elements, and inhibit winding means on said transferee element for setting up an opposing magnetic flux for preventing by magnetic flux cancellation the effect of an input signal only in said transferee element notwithstanding operation of said delay network means feeding said signal to the input winding of said transferee element, said inhibit winding means being effective only when operated concurrently with operation of said delay network means.

4. In a magnetic control system, a saturable core element of material having a high magnetic retentivity, winding means on said saturable core element for switching said core element into a condition of flux saturation in one polarity, delay network means including a storage condenser in circuit with an input winding on said saturable core element for reversing the polarity of flux saturation, following operation of said switching means, and inhibiting means comprising a winding of opposite polarity to said input winding for setting up an opposing magnetic flux to render said delay network means ineffective to change the polarity of flux saturation during its period of operation.

5. In a magnetic control system, a shift register including transferror and transferee magnetic signal storing elements having input and output windings therein, means including a delay network connected from the output winding of the transferror magnetic signal storing element to the input winding on said transferee magnetic-signal storing element for entering a signal in said transferee magnetic signal storing element, means including a separate shift winding for reading a signal out of said transferee magnetic signal storing element following operation of said signal entering means, and inhibiting means including winding means of opposite polarity to said input winding on said transferee magnetic signal storing element for setting up an opposing magnetic flux for preventing a change in polarity of flux saturation in said transferee magnetic signal storing element, notwithstanding the concurrent operation of said signal entering means.

6. In a magnetic control system first and second saturable cores of material having a high magnetic retentivity, each core having an output winding thereon in which a current is generated when the polarity of flux saturation in the associated core is reversed from one predetermined polarity to the other, shift windings on each of said cores for simultaneously establishing said other polarity, means including a second winding on each of said cores for initially establishing said one predetermined polarity of saturation, and inhibiting means including an inhibit winding on one of said cores for setting up an opposing magnetic flux for rendering said polarity establishing means ineffective on said core, said polarity establishing means concurrently establishing the polarity of the other saturable core.

7. In a magnetic control system, a first transferror and transferee magnetic core of material having a high magnetic retentivity, a second transferror and transferee magnetic core of material having high magnetic retentivity, an input, output and a shift winding on each of said magnetic cores, said shift windings connected in a series circuit adapted to shift said magnetic cores from a first magnetic flux to a second magnetic flux state, said output winding on said first transferror core connected in circuit with the input winding of said first transferee core, said input winding of said first transferror core is adapted to be connected to a source of direct current, thereby to produce said output signal of similar polarity in response to energization of said shift windings, the output winding of said second transferror core connected in circuit with the input winding of said second transferee core, said input winding of said second transferror core adapted to be connected to a source of digital signals, an inhibit winding on said first transferee core of opposite polarity to said input windings connected in series with the input winding of said second transferee core, said inhibit winding of a polarity adapted to prevent signals which enter said input winding of said first transferee core from said first transferror core from changing the flux condition of said first transferee core when signals from said second transferror core simultaneously enter said inhibit winding, whereby the output winding of said second transferee core produces a digital representing signal and the output winding of said first transferee core produces the complement of said digital representing signal.

References Cited in the file of this patent
UNITED STATES PATENTS

| | | |
|---|---|---|
| 2,652,501 | Wilson | Sept. 15, 1953 |
| 2,673,337 | Avery | Mar. 3, 1954 |
| 2,708,722 | An Wang | May 17, 1955 |
| 2,719,962 | Karnaugh | Oct. 4, 1955 |
| 2,729,808 | Auerbach et al. | Jan. 3, 1956 |
| 2,763,851 | Haynes | Sept. 18, 1956 |
| 2,766,388 | Wulfing | Oct. 9, 1956 |

OTHER REFERENCES

"Thesis on Magnetic Cores," by M. K. Haynes (pp. 36–38), December 28, 1950.